United States Patent [19]

Yates

[11] 3,816,152

[45] June 11, 1974

[54] COUPLING AGENT COPOLYMER DISPERSIONS OF SILICIC ACIDS AND ORGANOFUNCTIONAL SILANES

[75] Inventor: Paul Clifford Yates, Wilmington, Del.

[73] Assignee: E. I. du Pont de Nemours and Company, Wilmington, Del.

[22] Filed: Nov. 24, 1971

[21] Appl. No.: 202,005

Related U.S. Application Data

[63] Continuation-in-part of Ser. No. 11,774, June 16, 1970, abandoned.

[52] U.S. Cl.... 106/287 SE, 106/287 SB, 117/124 F, 117/126 GS, 260/41 AG, 260/46.5 R, 260/40 R
[51] Int. Cl.............................................. C09k 3/00
[58] Field of Search.............. 117/126 GS; 106/287; 260/46.5 UA, 37, 46.5 R, 448.2 Q, 448.8 AD

[56] References Cited
UNITED STATES PATENTS

| | | | |
|---|---|---|---|
| 2,688,006 | 8/1954 | Steinman | 117/126 GS |
| 3,017,384 | 1/1962 | Modic | 117/126 GS |
| 3,046,242 | 7/1962 | Santelli | 260/46.5 R |
| 3,472,729 | 10/1969 | Sterman | 260/41 AG |

FOREIGN PATENTS OR APPLICATIONS

| | | | |
|---|---|---|---|
| 1,057,980 | 2/1967 | Great Britain | |
| 706,719 | 4/1954 | Great Britain | |
| 1,082,116 | 9/1967 | Great Britain | 260/46.5 R |
| 956,276 | 4/1964 | Great Britain | |

*Primary Examiner*—Theodore Morris

[57] ABSTRACT

Coupling agents comprising copolymers of an organofunctional hydroxysilane and silicic acid or polysilicic acid having a degree of polymerization of not more than 1000 are more economical to use than organofunctional hydroxysilanes alone, and reinforcing fillers treated with these coupling agents exhibit less static electricity build-up and are more easily wet by organic resins. Solutions of an organofunctional silane and a tetraalkyl orthosilicate in each other or in nonaqueous solvents are stable coupling agents precursors which can be stored for several months with no loss in coupling effectiveness.

17 Claims, No Drawings

COUPLING AGENT COPOLYMER DISPERSIONS OF SILICIC ACIDS AND ORGANOFUNCTIONAL SILANES

CROSS REFERENCE TO RELATED APPLICATION

This application is a continuation-in-part of my copending application Ser. No. 11,774, filed Feb. 16, 1970 now abandoned.

BACKGROUND OF THE INVENTION

This invention is directed toward coupling agent formulations comprising compatible mixtures of an organofunctional silane and a silicon compound which upon hydrolysis in aqueous solution yields monosilicic or polysilicic acid, the polysilicic acid having a degree of polymerization of at most 1,000; and reinforcing fillers treated with such formulations.

This invention is also directed to coupling agents consisting of copolymers of certain hydroxysilanes and a silicic acid having a degree of polymerization of at most 1,000.

Organofunctional silanes are well known in the plastic-forming arts as excellent coupling agents for bonding organic resins to embedded reinforcement materials. Ordinarily, reinforcement materials are coated with and bonded to coupling agents and then embedded in the impregnating resins which in turn bond with functional groups on the coupling agents. Selection of the proper organofunctional silane is usually determined by choosing a coupling agent with a functional group that is capable of undergoing a known polymerization-condensation with one or more of the functional groups of the impregnating resin. Proper matching of silane organic functional groups with those of the impregnating resin is essential to the formation of strong, water-resistant chemical linkage of the two materials. It appears that only a percentage of the total number of silane organic functional groups copolymerize with the condensable reactive sites of the organic resins. Therefore, the spacing of functional organic groups on the reinforcement material to more closely correspond with the location of the condensible reactive sites on the resins can substantially reduce the amount of silane needed in a size or a finish without any reduction in bonding efficiency and strength.

Organofunctional silanes are expensive to manufacture, and this high cost presents a limitation to their use and to the use of high surface area reinforcing fillers for plastics. Although many less expensive coupling agents have been prepared, silanes retain a major portion of the market because they form bonds which remain strong even in the presence of moisture. Thus, there exists a real need for less expensive coupling agents with the effectiveness of the silanes.

Reinforcing fillers treated with organofunctional silanes are frequently difficult to handle and process due to static electricity build-up. Furthermore, treatment with hydrolyzed organofunctional silanes causes the reinforcing fillers to become hydrophobic, adversely affecting the rate of wetting of the filler by the resin. Consequently, there is a need for a coupling agent which is readily wet by the resin and does not contribute to static build-up.

It is well known that hydroxysilanes react with silanol (SiOH) groups. This is the basis for the attachment of hydroxysilanes to, for example, glass fibers.

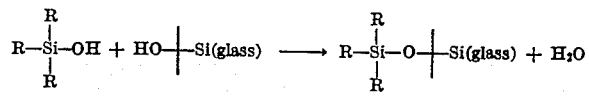

This reaction has also been utilized by Wolf et al., British Pat. No. 956,276, to prepare an anion exchange resin by condensing an aminoalkyl hydroxysilane with silicic acid to yield solid, three-dimensional polymers. The utility of that invention is based on the fact that mixtures of aminoalkyl hydroxysilanes and silicic acid or polysilicic acid readily form a gel and that these gels contain active ion exchange groups. Neither the aminoalkyl hydroxysilanes nor their copolymers with silicic acid are effective coupling agents for polyester resins.

SUMMARY OF THE INVENTION

There are now provided novel coupling agent formulations comprising compatible mixtures of 25 to 90 mole percent of an organofunctional silane of the general formula

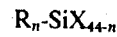

wherein
R is selected from the group consisting of alkenylcarboxyalkyl, carboxyalkenyl, and alkenyl, each having a total of two to 18 carbon atoms;
X is at least one member of the group consisting of hydroxyl, halogen and alkoxyl having one to six carbon atoms; and
n is a positive integer of from 1 to 3; with 10 to 75 mole percent of a silicic acid source represented by the general formula

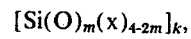

wherein
m is 0 to 1;
k is a positive integer from 1 to 1000;
x is at least one member of the group consisting of hydroxyl, halogen, and alkoxyl having one to six carbon atoms; provided that at least one of the x groups is halogen or alkoxyl.

These components are hydrolyzed and copolymerized in part under controlled conditions to yield novel coupling agents for reinforced resin composites.

DETAILED DESCRIPTION OF THE INVENTION

Coupling agent formulations containing 50 to 75 mole percent of the organofunctional silane are preferred for maximum strength. However, formulations containing 25 to 50 mole percent of the organofunctional silane are satisfactory where cost saving or antistatic properties are more important.

In this disclosure, the term "coupling agent" means those hydrolyzed compounds and mixtures of compounds which are applied to the reinforcing filler. These compositions usually are not sufficiently stable to be stored for extended periods. They are normally prepared from coupling agent precursors or formulations at the time and place of use. The composition which exists on the surface of the treated reinforcing filler and which binds it to the polymer is probably a highly condensed, crosslinked polymer or copolymer of the coupling agent or agents. The coupling agents of this invention are copolymers of hydrolyzed organofunctional silanes and monosilicic acid or polysilicic acid.

The term "coupling agent formulation" means a precursor of the coupling agent or a mixture of compounds which are stable in storage and shipment, but which must further react to form the coupling agent. The preferred coupling agent formulations of the present invention are stable anhydrous solutions of organofunctional silanes and tetraalkyl orthosilicates.

The term "organofunctional hydroxysilane" means compounds of the formula $R_nSi(OH)_{4-n}$ where the alkenylcarboxylakyl, carboxylalkenyl, or alkenyl group is retained but the halogen or alkoxy groups have been replaced with hydroxyl groups.

The term "compatible," as applied to mixtures in solution or dispersion, means that the components do not react chemically with each other and are otherwise unchanged in storage for at least several weeks.

As used throughout this specification and claims, the term "mole percent" of a silane, a hydroxysilane, a silicic acid source, silicic acid, or polysilicic acid designates the percentage of silicon contributed by each such compound and not the percentage of actual molecules of such compounds, since the size of certain molecules either cannot be readily ascertained or is only an average value.

The term "silicic acid" is used to designate either monosilicic acid or a polysilicic acid.

The coupling agents of this invention, specifically the copolymers of organofunctional hydroxysilane and silicic acid, can be further formulated with other processing additives such as organic resinous bonding agents, lubricants, emulsifiers, anti-foaming agents and anti-static agents for sizing or finishing reinforcement materials.

The organofunctional hydroxysilane-silicic acid mixtures of the present invention do not readily form a gel and do not possess ion exchange properties. The present compositions thus differ from those of the above-discussed British Pat. 956,276. Further, if a composition of the present invention is gelled, e.g. by addition of base and heating, the resulting gel is unsatisfactory as a coupling agent for polyester resins.

The novel coupling agents of this invention are equivalent to prior art organofunctional silanes in coupling effectiveness, and, in addition, they cause less static build-up; they improve resin wet-out; and they can be dissolved in water to give solutions that are stable for from several hours to several days. Further, the novel coupling agent formulations of organofunctional silane and alkyl orthosilicate are indefinitely stable in the absence of water, so they are convenient to store and ship and use as a single package product.

Coupling Agent Formulation Components

The organofunctional silane compounds which can be used in the coupling agent formulations of this invention are multi-functional compounds that can be readily hydrolyzed and polymerized with monosilicic and polysilicic acids, copolymerized with each other, and copolymerized with organic, impregnating resins.

The R groups of the organosilane include, for instance:

carboxyvinyl, 2-carboxypropenyl, γ-methacryloxypropyl, γ-acryloxypropyl, vinyl, allyl, methallyl, decenyl, and octadecenyl.

The X groups can be hydroxyl, chlorine, bromine, methoxyl, ethoxyl, propoxyl, isopropoxyl, butoxyl (all isomers), pentoxyl (all isomers), and hexoxyl (all isomers).

Preferred are those organosilanes which have carboxyalkylene and alkenylcarboxyalkyl R groups and alkoxyl X groups. These silanes are commercially available and form stable solutions with tetraalkyl silicates. The most preferred organosilane is γ-methacryloxypropyltrimethoxysilane, which is readily available commercially and is very compatible with commercially important polyester resins.

The hydrolyzable substituents of the organofunctional silane and the silicic acid source may be a halide such as chloride or bromide or an alkoxide of one to six carbon atoms. Particularly preferred hydrolyzable substituents are methoxy and ethoxy groups.

The silicic acid source which can be used in the coupling agent formulations of this invention can be, in general, any material capable of hydrolyzing in aqueous solution to furnish silicic acid or polysilicic acid in a low molecular weight form.

Suitable materials include ethyl orthosilicate, partially polymerized compositions such as "Ethyl Silicate 40", as well as other alkyl orthosilicates. Halogen compounds such as silicon tetrachloride are slightly less desirable because of their vigorous reaction with water and corrosive by-products, such as HCl.

Particularly preferred sources of silicic acid are orthosilicate esters, such as ethyl orthosilicate since they are compatible in all proportions with the organosilanes of the invention and can be mixed with them and stored as a commodity. Because the combination of organofunctional silane with silicic acid is not sufficiently stable, such combination is less desirable to use as a coupling agent formulation, except for in situ preparation of coupling agents.

The following equations are believed representative of the types of hydrolysis and polymerization condensation reactions occurring within the system. Obviously the degree of polymerization of the silicon compounds can vary but should not exceed about 1000 units.

Eqn. (1), hydrolysis of silicic acid source
(assuming $k = 1$)

Eqn. (2), condensation of silicic acid,

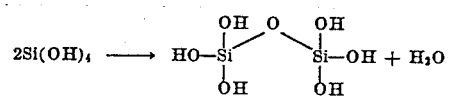

Eqn. (3), copolymerization of silicic acid and organofunctional hydroxysilanes

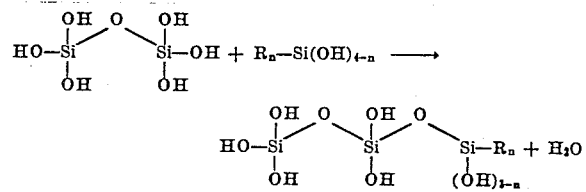

The copolymers of silicic acid and organofunctional hydroxysilanes form solutions or dispersions in water which are stable for a period of several hours or more. Even after storage for several days, these aqueous compositions can be used to treat reinforcing fillers, imparting effective coupling activity thereto. It had not heretofore been recognized that copolymers of silicic acid and organofunctional hydroxysilanes would be so stable and useful.

A possibility of combining an organofunctional hydroxysilane with a monosilicic or polysilicic acid via copolymerization introduces a degree of freedom not hitherto possible in this field of art. For example, all known prior art compositions require that the silane retain a minimum of at least one silicon-to-carbon bonded functional group (R group) per silicon atom in the polymer. It therefore follows that the maximum functionality of the organosilane, in terms of its condensation polymerization possibilities, is restricted to three in number. This restriction limits to three the number of groups that can undergo hydrolysis and polymerization condensation. If $n$ in the generic formula is substituted by integers 1, 2, or 3, the following results are possible:

Eqn. 4

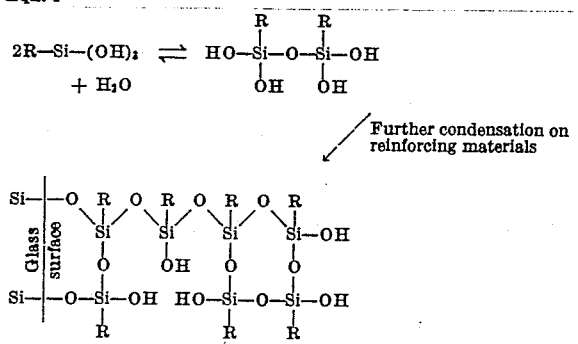

But here each silicon contains at least one R group, making a hydrophobic surface.

Eqn. 5

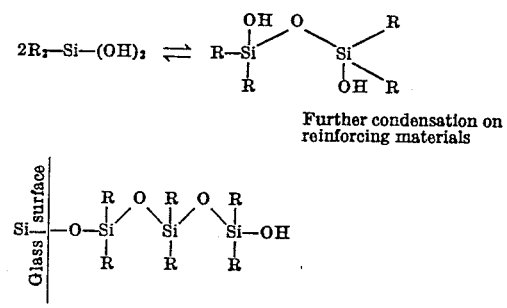

But here only linear polymers are possible; only a single point of attachment to the glass surface is likely, and only two points are possible even if the chain folds back. Note also, the high concentration of R groups on each silicon atom, making a very hydrophobic surface of poor wettability with a high tendency for electrostatic build-up. This poor wettability is a serious problem in the preparation of composites.

Eqn. 6(a)

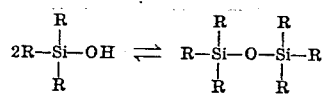

No further condensation is possible and coupling agent can not bond to the glass. If it does bond to the glass, as below, it can not self-polymerize to extend out from the glass surface.

Eqn. 6(b)

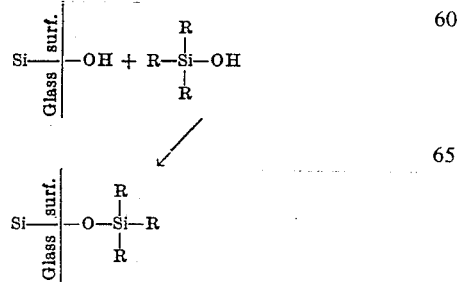

Limited to a monolayer extension of coupling agent. This gives a *very* hydrophobic surface, highly likely to cause static build-up.

As the concentration of organofunctional groups per silicon atom increases, there is also a corresponding increase in the amount of electrostatic build-up on the surface of the reinforcing materials, and especially on glass substrates. In addition to the problems encountered in electrostatic build-up, Equations 4–6 dramatically point out the additional limitations encountered where the hydroxysilane is the only element in the coupling agent.

As noted earlier, the larger the number of exposed functional groups on the organofunctional hydroxysilane-silicic acid copolymers, the greater the probability of copolymerizing with the impregnating resin. Unfortunately, multifunctional silanes, when proximately polymerized to reinforcement materials, cause such reinforcement materials to become very hydrophobic and difficult to wet with impregnating resins.

The copolymerization of the monosilicic and polysilicic acids with organofunctional hydroxysilanes prior to sizing or finishing the reinforcing materials, permits the use of these polyfunctional silanes without the concomitant disadvantages encountered when such groups are proximately bonded to the reinforcing materials. In addition, the copolymerization of organofunctional hydroxysilanes with monosilicic and polysilicic acids permits substantial reduction in the total amount of organofunctional silanes needed to coat the reinforcing materials. The reduction in concentration of silane does not reduce bonding efficiency or strengths; quite the contrary, the corresponding spacing and improved wetting in some instances produces superior results.

It is hypothesized that comparable and superior bonding strengths and reduced silane concentrations may be attributable to a more efficient matching of silane functional groups with the condensable reactive sites on the resin, and possibly the more numerous and more complex bonding of the coupling agent copolymers to the reinforcement materials. The following figures are representative of the multiplicity and complexity of the probable copolymerization of the coupling agent to a glass substrate.

FIG. (1) Possible structure of cross-linked compositions containing three resin-reactive groups on a single silicon atom.

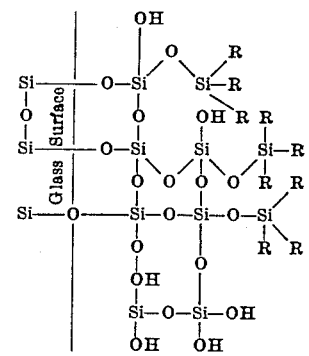

FIG. (2) Possible 3-dimensional cross-linked structures containing two R groups on a single silicon atom.

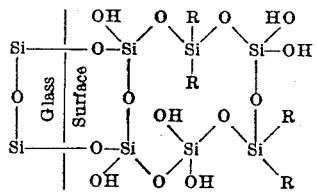

FIG. (3) More polar possible structure containing single R groups on a silicon atom due to interspacing of silicic acid units.

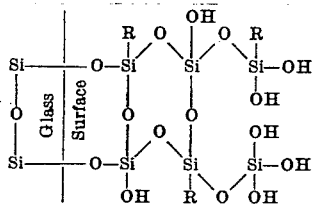

There are only 3 R groups per 6 silicon atoms instead of 6 per 6, as would occur with a pure organosilane.

In summary, the addition of a silicic acid source (leading to monosilicic and/or polysilicic acids) increases the number of reactive sites which can bond to the reinforcing materials and further permits the use of multifunctional silanes, thereby enhancing copolymerization with the impregnated resins and reduces the total concentration of organosilane needed to achieve comparable or superior bonding strengths. Because of this multiple bonding, both at the site of reinforcing materials and at the copolymerization sites of the resins, adhesion to the reinforcing materials is at least as good as with prior art coupling agents. In addition, water resistance is equally good. Resinous laminates structurally reinforced with the compositions of this invention have dry and wet strengths and modulus of rupture values approximately equal to those of resinous laminates where organofunctional silanes are used alone.

Preparation of Coupling Agent Formulations

The coupling agent formulations are prepared by mixing the two components in their proper proportions, optionally in an appropriate solvent. As previously noted, the organofunctional silane contributes 25 to 90 mole percent of the total silicon present in the formulation and the silicic acid source comprises 10 to 75 mole percent of the total silicon present in the formulation.

Many organofunctional silanes and silicic acid sources form compatible, stable mixtures. For example, in the preferred embodiment, ethyl orthosilicate and other silicon orthoesters can be mixed with organofunctional silanes to give compatible, concentrated, stable solutions in each other which can be stored indefinitely, then diluted, hydrolyzed, and polymerized as required. Preferably, the two components will have approximately equal hydrolysis times.

Optionally, the two components may be dissolved in a solvent such as ethanol, isopropyl alcohol, ethylene glycol, propylene glycol, tetrahydrofuran, diethylene glycol dimethyl ether, or mixtures of such solvents. The resulting solution disperses more easily in water, thus avoiding high local concentrations which could result in overpolymerization. Partially hydrolyzed alkyl orthosilicates may be used in the coupling agent formulations provided that no free water is present. Tetraethyl orthosilicate is the preferred tetraalkyl orthosilicate for reasons of economy and convenience, since it is readily available commercially.

Preparation of Coupling Agents

The coupling agents of this invention are prepared by hydrolyzing the organofunctional silane and silicic acid source and then allowing them to copolymerize to an extent sufficient to obtain the desired coupling activity, yet still have a solution or a stable dispersion in water. Higher degrees of polymerization yield gels or precipitates which are not effective as coupling agents and which do not form stable dispersions in water.

Generally, hydrolysis of the organofunctional silane and the silicic acid source is performed in dilute aqueous solution. This minimizes the possibility of premature reaction between them and the possible gelation of the mono or polysilicates. The combined concentration of the organofunctional silane and the silicic acid source in the solution will range from one tenth to ten percent by weight of the solution, .25 to 2 percent being preferred. Adequate agitation is also required during addition of the two reactants to rapidly disperse them and avoid gelation.

It is often desirable to add some form of catalyst to facilitate the hydrolysis and polymerization of the formulation components. Suitable catalysts include acids, bases, and soluble salts of transition metal ions such as zinc and copper. Acids, and particularly volatile organic acids such as acetic and formic, are the preferred hydrolysis-polymerization initiators. Acid initiation of hydrolysis-polymerization requires careful adjustment of pH. pH Values below 2 will result in a too-rapid hydrolysis of the organosilanes as well as the functional groups of the resin, while pH's in excess of 5 cause excessive copolymerization of the active ingredients with one another. The preferred range for acid hydrolysis is, therefore, 2–5.

Organic amines, ammonia, sodium hydroxide, potassium hydroxide and guanidine hydroxide are suitable basic initiators for hydrolysis-polymerization of the primary components of the coupling agent formulation. Care should be taken to adjust pH between 8 and 10.

Oftentimes, the rate of hydrolysis of the organofunctional silane constituent will substantially differ from that of the silicic acid source. This permits hydrolysis of each constituent separately, thereby enabling one to exercise greater control by adjustment of pH over polymerization between the two ingredients.

If the silane and silicic acid source are hydrolyzed separately, care should be taken to avoid excessive polymerization prior to mixing the two hydrolyzed components. Since high pH favors polymerization, it is preferred to use acid hydrolysis when the two components are hydrolyzed separately. However, alkaline hydrolysis may be used if each solution is dilute and if the hydrolysis time, prior to mixing, is held to a minimum.

Instead of a hydrolyzable silicic acid source, solutions of silicic acid can be used. These can be produced by deionizing or acidifying alkali metal silicates, such as sodium, potassium, lithium or guanidinium silicate. Polymers of silicic acid having a degree of polymerization of at most 1,000 can be prepared either by deionizing a partially prepolymerized silicate such as a higher ratio ("ratio" being the molar ratio of $SiO_2$ to alkali metal oxide in the silicate) alkali metal silicates, or by starting with monomeric silicic acid and heating for a short period of time, preferably in the presence of a small amount of a catalyst such as hydroxyl ions or fluoride ions at a temperature and for a time sufficient to achieve the desired degree of polymerization. The degree of polymerization can be ascertained by techniques known in the art which are sensitive to the molecular weight of polymeric molecules, such as by measurements of the intrinsic viscosity, by light scattering, by measurements of the osmotic pressure, or by measurements of the elevation of the boiling point or depression of the freezing point of the solution.

Molecular weight can also be determined by procedures specific to silica, such as titration with a gelatin, as given in an article by R. K. Iler and P. S. Pinkney (Ind. Eng. Chem. 39, 1379 (1947), by measurement of the rate of color development using a molybdic acid colorimetric reagent as disclosed in an article by G. B. Alexander ("The Polymerization of Monosilicic Acid", J. Am. Chem. Soc., 76, 2094 (1954)).

The polysilicic acid should have a degree of polymerization no more than 1,000 and preferably less than about 100. The most preferred are monomeric silicic acid and polysilicic acids having a degree of polymerization less than 10.

The hydrolysis of the organosilane may be carried out after the addition of the silicic or polysilicic acid, especially when it is added as a dilute solution in water. Alternatively, the organosilane may be hydrolyzed in a separate step, and the silicic or polysilicic acid is added to the resulting hydroxysilane solution.

Methods of Treating Reinforcing Materials with Coupling Agents

Hydrolyzed, partially copolymerized coupling agents of this invention can be applied to the reinforcing fillers in any convenient manner. Normally, a reinforcing filler is immersed in the dilute aqueous solution containing the coupling agent and removed from the treating bath; then, excess moisture is wrung out. The amount of wet add-on will vary with the nature of the filler but usually will be within the range of 50–150 weight percent. Glass fibers will normally retain a weight of treating solution equal to the original weight of filler. The amount of dry add-on will most conveniently be varied by varying the concentration of the coupling agent in the treating bath. With a 100 percent wet add-on, the proper concentration will be 0.01 to 20 percent by weight. For glass fibers, the practical concentration range is 0.1–0.2 percent. The dry add-on of the coupling agent will range from 0.01 to 20 percent by weight of active ingredients based on the weight of the reinforcing material. A dry add-on of 0.25 percent to 10 percent by weight is preferred, and usually the reinforcing materials having the greatest surface area will contain larger amounts of coupling agent. Low surface area materials, such as glass fibers, can be bound to the organic resins with lower concentrations of coupling agent.

After immersion and removal of excess moisture (solvent) the coated support materials are rapidly dried at temperatures as high as 200°C. provided, however, that the organic portions of the coupling agent do not undergo degradation at these temperatures. This rapid curing completes the polymerization of the constituents with one another and the bonding of the coupling agent to the support material. Although drying can be accomplished at room temperature, curing between temperatures of 50° and 180°C. is recommended and preferred. Of course, curing times will vary inversely with the temperature and may range from a few minutes at 200°C. to 24 hours at room temperature.

A more economic and convenient method for applying a coupling agent to support materials, is the treatment of these materials with coupling agents as an integral step in their manufacture. In a typical sizing process, the various components of the size are pre-mixed and applied to the reinforcement materials by padding or spraying methods.

Because the size is designed to perform a plurality of functions (for instance, bond multifilamentous glass fibrils into a coherent strand, protect support materials from self abrasion and chemical degradation during handling or weaving and couple the support materials to polymeric resins), it can contain several components in addition to coupling agents. A typical size for glass fibers can contain organic resinous bonding agents, lubricants, anti-static agents, emulsifiers, and coupling agents.

It should be recognized that the ability of the coupling agent to function as a bond between the surface of the filler and the resin is seriously interfered with by the presence of the wide variety of the other constituents of the size. Many of these materials form relatively inert patches on the surface of the filler, and since these are not adequately bonded to the resin in subsequent molding operations, they function as weak points in the overall structure. It should be noted that most such materials as the bonding resins of a size, the lubricating oils, etc., carry a negative charge.

In one of the preferred embodiments of this invention it has been found that the addition of certain positively charged colloidal silica particles to a size containing the coupling agent of this invention improves the performance of the coupling agent.

The colloidal particles of this sol range in size from 2 to 100 millimicrons, have a surface coating of polymerized metal ions (aluminum, chromium, titanium or zirconium) which gives them a substantial positive charge, and are stable on the acid side.

Reinforcing Materials

A reinforcing material is a substance which when incorporated into or coupled to the organic resin (impregnating resin) enhances the strength and modulus of the cured laminate. Reinforcing materials of this invention can be in the form of rovings, fabrics, continuous and chopped-strand mat, chopped strands and milled fiber. Among the more popular of the reinforcing materials are the "low sodium glass fibers" ('E' glass fibers, 'S' glass fibers and beta-glass fibers) asbestos, sisal, cotton, quartz, glass microspheres, graphite, refractory aluminosilicate fibers, and metal whiskers.

"Low sodium glass fibers" are by far the most popular of the reinforcing materials, and are preferred for the laminate composition of this invention. Compositions of "low sodium" glass fibers can, and often do, vary; however, low alkali metal oxide content is essential. Typical low sodium glass fibers can have the following compositions:

| Components | Per cent of Content |
|---|---|
| $SiO_2$ | 54.3% |
| $Al_2O_3$ and $Fe_2O_3$ | 15.2% |
| CaO | 17.3% |
| MgO | 4.7% |
| $B_2O_3$ | 8.0% |
| $Na_2O$ and $K_2O$ | 0.6% |

It has become rather common practice to incorporate less expensive filler materials into the laminating composition for reasons of economy and in some instances for reasons of esthetics.

Representative of the filler materials which can be incorporated into the laminating composition of this invention are kaolin, calcium carbonate, talc, chrysotile asbestos, mica, alumina, zircon, zirconia, magnesium oxide, colloidal amorphous silica, attapulgite, wollastonite, perlite, fly ash, calcium silicate, aggregate and fibers.

The amount of reinforcing materials present in the composition may be as little as 1 percent by weight and as high as 90 percent by weight of the laminated article, depending of course, on the relative densities of the resins, the reinforcing materials, and the method of fabrication.

Impregnating Resins

The organic resinous materials which copolymerize with the organofunctional groups of the coupling agent composition are amorphous, liquid, semi-solid or solid materials produced by union (polymerization or condensation) of a large number of molecules of 1, 2, or less frequently 3 relatively simple compounds. Resin, as the term is used in this invention embraces both synthetic and chemically modified natural resins.

Particularly preferred are the unsaturated polyester resins. These are typically a mixture of styrene with a polyester of an unsaturated dibasic acid and a polyol. One such composition, called Rohm & Haas Paraplex P43 is believed to contain the polyester of maleic acid and ethylene glycol. Other resins may contain chlorinated or brominated polymers to impart flame retardance, such as Dion resins sold by Diamond Shamrock, Inc. or Hetron resins sold by Hooker Chemical Co.

Methods of Bonding Reinforcing Materials to Organic Impregnating Resins

The coated support material is cut in the shape of the object to be laminated, placed on the laminate die and covered with sufficient impregnating resin to wet the support material. Support material or resin are successively layered one atop another until the requisite ply laminate is attained. After layering, excess resin and air bubbles are squeezed out by rolling the laminate between rubber rollers. The slightly compressed laminate can then be hot-pressed at 100°–150°C. and a pressure of 100 psi or more until the resin sets. After hot-pressing is complete the laminate is cooled and removed from the die. The resulting laminate will exhibit both excellent wet and dry strengths which will equal or exceed those attained where undiluted organofunctional silanes are used alone to bond the impregnating resins to the reinforcing materials.

Other fabrication methods, such as injection molding, extrusion, and the use of pre-impregnated, partially polymerized compositions, may be used with these coupling agents. In certain techniques, the use of pressure is not necessary.

The following examples are presented to further illustrate, not limit, this invention. Parts and percentages as they are used in the examples, refer to weight unless otherwise stipulated.

EXAMPLE 1

One hundred parts of ethyl orthosilicate are added to 47 parts by weight of ethyl alcohol and 45 parts by weight of tenth normal aqueous HCl. This is stirred for 1 hour, after which the hydrolysis of the ethyl orthosilicate to essentially monomeric silicic acid is complete. A second solution is prepared containing 80 parts by weight of γ-methacryloxypropyl-trimethoxysilane, which is diluted with 70 parts of water, and the pH of the mixture adjusted to 4.0 with acetic acid. This is stirred for 12 minutes, which completes the hydrolysis of this material. This is then added to 140 parts of the hydrolyzed ethyl orthosilicate solution, representing 50 parts of the polymerizable silicon originating from the organosilane and 50 parts of the polymerizing silicon atoms originating from the ethyl orthosilicate. The mixture is diluted with water to a 2 percent concentration of the essential ingredients of the invention based on the weight of solution, and is applied to three 11 inch wide strips of "E" glass fabric, style 181, heat-cleaned glass. The strips are soaked in the treating solution for approximately 3 minutes, and passed through a wringer and the wet pickup measured. The tension on the rollers is adjusted to give a wet pickup of approximately 50 percent. These strips are placed on clean towels and dried for 10 minutes at 125°C. in an air circulating oven. They are rinsed in water for approximately 2 minutes, wrung out, placed on clean towels and dried for 10 minutes at 125°C. They are then cut into four 9 inch wide panels in the warp direction and trimmed to 10 inches along the fill direction, the edges being then frayed to a depth of about three-eighths inch by pulling out longitudinal threads.

Four hundred and ninety-five parts by weight of a polyester resin consisting of a mixture of styrene with a maleic anhydride-glycol polyester copolymer, called Rohm & Haas "Paraplex" P43, are mixed with 5 parts by weight of benzoyl peroxide powder, which is dispersed in the resin by mechanically stirring while heating the resin to 43°C. The resin-benzoyl peroxide catalyst mixture is then maintained at 43°C. for approximately 20 minutes.

While the catalyzed resin is held at 43°C., a ½ inch × 12.5 inch × 12.5 inch steam cover plate is placed on a hot plate maintained at the same temperature, and covered with a 12.5 inch by 12.5 inch ferrotype chromium plate. A 60 inch × 30 inch strip of cellophane is located on the plate, and th laminate die is sprayed with a release agent, which is an aerosol of zinc stearate. A ⅛ inch × 12.5 inch × 12.5 inch metal plate with a ⅛ inch × 10.5 inch × 9.5 inch cutout is then placed on the die, covered with the cellophane, and the glass fabric panels are laid on the die with each layer being treated with sufficient resin to cover and wet in the glass fabric. Twelve pieces of fabric are used to make 12 ply laminate, and the excess resin and air bubbles are squeezed out by rolling with a rubber roller. The laminate is then covered with the folded cellophane, a second ferroplate placed on top and the whole assembly of die and resin enclosed in aluminum foil.

This is placed in a hydraulic ram press preheated to 175°F. and pressed at a pressure of seven tons per square inch, which serves to eliminate the excess resin. It is held at 175°F. for 15 minutes and then heated to 225°F. and held at this temperature for 20 minutes. It is then heated to 275°F. and held at this temperature for 20 minutes. The heat is turned off, the press cooled to 240°F. with air, after which cooling water is passed through the heaters to cool the press to 225°F. Pressure is relieved, the laminates removed and cut into 1 inch × 4.5 inch test bars, which are sanded to a thickness of 0.5 inch ± 0.02 inch.

The modulus of rupture of these bars is determined on a 2 inch span with an Instron tester. Five bars are tested to determine the dry strength and an additional five bars tested to determine the average wet strength, following boiling in water for a two hour period.

The rupture strength of this laminate is 85,400 psi when dry and 73,400 psi after boiling.

For comparison, two laminates are prepared using the organosilane alone at an identical level of silicon atoms on the glass cloth. One such laminate gives a dry transverse rupture strength of 76,000 psi and a wet strength of 67,300 psi, while a second laminate with a slightly different pH of hydrolysis, has a dry strength of 87,000 psi and a wet strength of 82,000 psi.

Thus it can be concluded that even though the expensive organosilane constituent has been diluted to the extent of 50 percent with the much less expensive ethyl orthosilicate, the performance of the resulting laminate falls within the range of variation in strength to that expected for a laminate containing only the organosilane as a coupling agent, as a function of minor variations in the conditions of application similar to those to be expected under commercial application conditions.

EXAMPLE 2

The same ingredients and procedures as in Example 1 are employed, but the relative amounts of the organosilane and the ethyl orthosilicate ingredients are adjusted to give 25 percent of the silicon atoms in the composition from the ethyl orthosilicate and 75 percent from the organosilane. The strength of this laminate is 87,000 psi, dry strength, and 83,000 psi, wet strength. It is noted that the glass cloths treated with both this composition and the composition of Example 1 have a softer hand and a much lower tendency to generate static charges in handling than the organosilane treated controls described in Example 1.

EXAMPLE 3

The procedure of Example 1 and the materials of Example 1 are used, with the exception that the organosilane employed is vinyl triethoxysilane rather than γ-methacryloxypropyl-trimethoxysilane. The dry modulus of rupture of this material is 75,400 psi and the wet modulus of rupture after boiling 2 hours in water is 70,300 psi.

A control consisting wholly of the more expensive organosilane gives essentially identical values, showing, as in Example 1, that up to a 50 percent substitution of the more expensive vinyl silane with silicic acid originating from ethyl orthosilicate results in no diminution of strength. As noted in Examples 1 and 2, this material generates relatively little static compared to a control containing only the vinyl silane and the hand is much softer. It is also noted that the resin wets and spreads over the surface of the glass fabric more rapidly and more completely than over the control.

EXAMPLE 4

The procedures and materials of Example 1 are repeated, except that the silicic acid is prepared by passing a 3 percent solution of sodium metasilicate through the hydrogen form of an ion exchange resin to give a silicic acid solution having a pH of approximately 3. This is used instead of water as the hydrolyzing solution for the γ-methacryloxypropyl-trimethoxysilane. The hydrolysis and application to the cloth is repeated as described in Example 1 with the relative proportions being 50 percent of the total silicon atoms originating from the organosilane and 50 percent from the silicic acid prepared by the deionization of the sodium silicate solution. It is found that wet and dry strengths are within experimental error of those obtained in Example 1, and within experimental error of the strength obtainable using pure organosilane. This is, of course, much more expensive than the composition of this example.

EXAMPLE 5

The ingredients and procedures of Example 1 are employed but the relative amounts of the organosilane and the ethyl orthosilicate ingredients are adjusted to give 75 percent of the silicon atoms in the composition from the ethyl orthosilicate and 25 percent from the organosilane. The strength of this laminate is 76,900 psi dry and 57,000 psi wet.

EXAMPLE 6

Use of Silane-Ethyl Orthosilicate Mixture as Coupling Agent

Fifty parts by weight of tetraethyl orthosilicate (TEOS) were added to fifty parts by weight of γ-methacryloxypropyl-trimethoxysilane (Union Carbide's A174 Silane). The resulting mixture was a clear, homogeneous solution.

Four parts by weight of the TEOS-silane mixture were added to 1996 parts by weight of distilled water, and the pH of the mixture was adjusted to 4.0 with 0.1N hydrochloric acid. The mixture was agitated during both additions. The solution developed a fine cloudiness which disappeared after an additional few minutes of stirring.

After 1 hour, 1,000 parts by weight of this solution was applied to E glass cloth as described in Example 1. The same resin ingredients and procedure as in Example 1 were employed to make a glass-polyester laminate.

The strength of this laminate was 86,000 psi, dry strength, and 79,000 psi, wet strength.

The other 1,000 parts by weight of the dilute, hydrolyzed solution was allowed to stand at room temperature for six weeks and then applied to E glass cloth as described in Example 1. The same resin ingredients and procedure as before were employed to make a glass-polyester laminate.

The strength of this laminate was 84,500 psi, dry strength, and 75,400 psi, wet strength.

EXAMPLE 7

Use of Aged Mixture of Silane-Ethyl Silicate as Coupling Agent

A mixture of 50 parts by weight of tetraethyl orthosilicate (TEOS) and 50 parts by weight of γ-methacryloxypropyl-trimethoxysilane, prepared as in Example 6, was allowed to age at room temperature for 2 months.

After two months, two parts by weight of the clear TEOS-silane solution were used to prepare 1,000 parts of a dilute aqueous solution as described in Example 6. This dilute solution was applied to E glass cloth and a glass-polyester laminate was made as described in Example 1.

The strength of this laminate was 89,000 psi, dry strength, and 81,000 psi, wet strength.

I claim:

1. A water-dispersible coupling agent consisting essentially of a partially copolymerized mixture of 25 to 90 mole percent of a hydroxysilane having the formula

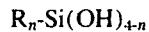

wherein
R is selected from the group consisting of alkenylcarboxyalkyl, carboxyalkenyl, and alkenyl, each having two to 18 carbon atoms; and
n is a positive integer of from 1 to 3;
with 10 to 75 mole percent of a silicic acid having a degree of polymerization of at most 1,000;

2. A coupling agent of claim 1 wherein the proportion of the hydroxysilane is 25 to 50 mole percent and the proportion of the silicic acid is 50 to 75 mole percent.

3. A coupling agent of claim 1 wherein the silicic acid is monosilicic acid or polysilicic acid having a degree of polymerization of less than 10.

4. A coupling agent of claim 3 wherein the R group of the hydroxysilane is vinyl or γ-methacryloxypropyl.

5. A coupling agent of claim 4, wherein the R group of the hydroxysilane is γ-methacryloxypropyl.

6. A process for the preparation of a water-dispersible coupling agent consisting essentially of a partially copolymerized mixture of 25 to 90 mole percent of a hydroxysilane having the formula $$R_n\text{-Si(OH)}_{4-n}$$

wherein
R is selected from the group consisting of alkenylcarboxyalkyl, carboxyalkenyl, and alkenyl, each having two to 18 carbon atoms; and
n is a positive integer of from 1 to 3; with 10 to 75 mole precent of a silicic acid having a degree of polymerization of at most 1000;
said process comprising contacting together in an aqueous solution a coupling agent formulation consisting essentially of a compatible mixture of 25 to 90 mole percent of an organofunctional silane having the formula $$R_n\text{-SiX}_{4-n}$$

wherein
R is selected from the group consisting of alkenylcarboxyalkyl, carboxyalkenyl, and alkenyl, each having two to 18 carbon atoms;
X is selected from the group consisting of hydroxyl, halogen, and alkoxyl having one to six carbon atoms; and
n is a positive integer of from 1 to 3;
with 10 to 75 mole percent of a silicic acid source having the formula $$[\text{Si(O)}_m(x)_{4-2m}]_k ,$$

wherein
m is 0 to 1;
k is a positive integer from 1 to 1000; and
x is selected from the group consisting of hydroxyl, halogen, and alkoxyl having one to six carbon atoms; provided that at least one of the x groups is halogen or alkoxyl; the initial concentration of the coupling agent formulation being 0.1 to 10 weight percent, and the reaction being carried out at a pH within a range of 2 to 5 or 8 to 10.

7. A process for the preparation of a water-dispersible coupling agent consisting essentially of a partially copolymerized mixture of 25 to 90 mole percent of a hydroxysilane having the formula $$R_n\text{-Si(OH)}_{4-n}$$

wherein
R is selected from the group consisting of alkenylcarboxyalkyl, carboxyalkenyl, and alkenyl, each having two to 18 carbon atoms; and n is a positive integer of from 1 to 3;
with 10 to 75 mole percent of a silicic acid having a degree of polymerization of at most 1000;
said process comprising contacting in an aqueous solution 25 to 90 mole percent of the above-described hydroxysilane with 10 to 75 mole percent of a silicic acid having a degree of polymerization of at most 1000;

8. A process for the preparation of a water-dispersible coupling agent consisting essentially of a partially copolymerized mixture of 25 to 90 mole percent of a hydroxysilane having the formula $$R_n\text{SiX}_{4-n}$$

wherein
R is selected from the group consisting of alkenylcarboxyalkyl, carboxyalkenyl, and alkenyl, each having two to 18 carbon atoms; and
n is a positive integer of from 1 to 3; with 10 to 75 mole percent of a silicic acid having a degree of polymerization of at most 1,000;
said process comprising contacting in an aqueous solution 25 to 90 mole percent of an organosilane having the formula $$R_n\text{-SiX}_{4-n}$$

wherein
R is selected from the group consisting of alkenylcarboxyalkyl, carboxyalkenyl, and alkenyl, each having two to 18 carbon atoms; and n is a positive integer of from 1 to 3;
with 10 to 75 mole percent of a silicic acid having a degree of polymerization of at most 1000;
the reaction being carried out at a pH within a range of 2 to 5 or 8 to 10.

9. A glass-fiber coupling material for use in polyester resin composites, said material having on its surface a coating of a coupling agent of claim 1; the amount of the dry coupling agent being 0.25 to 10 weight percent based on the glass fiber.

10. A glass-fiber coupling material for use in polyester resin composites, said material having on its surface a coating of a coupling agent of claim 3; the amount of the dry coupling agent being 0.25 to 10 weight percent based on the glass fiber.

11. A glass fiber coupling material for use in polyester resin composites, said material having on its surface a coating of a coupling agent of claim 5; the amount of the dry coupling agent being 0.25 to 10 weight percent based on the glass fiber.

12. A polyester resin composite reinforced with the glass fiber material of claim 9.

13. A polyester resin composite reinforced with the glass fiber material of claim 10.

14. A polyester resin composite reinforced with the glass fiber material of claim 11.

15. A coupling agent formulation consisting essentially of 50 to 90 mole percent of an organofunctional silane having the formula $$R_n\text{-SiX}_{4-n}$$

wherein
R is selected from the group consisting of carboxyalkylene and alkenylcarboxyalkyl;

X is alkoxyl; and $n$ is a positive integer of from 1 to 3;

and 25 to 50 mole percent of a silicic acid source having the formula $$[Si(O)_m(x)_{4-2m}]_k$$

wherein $m$ is 0 to 1;

$k$ is a positive integer from 1 to 1,000;

$x$ is alkoxyl having one to six carbon atoms.

16. A water-dispersible coupling agent consisting essentially of a partially copolymerized mixture of 50 to 75 mole percent of a hydroxysilane having the formula $$R_n\text{-}Si(OH)_{4-n}$$

wherein

R is selected from the group consisting of alkenylcarboxyalkyl and carboxyalkenyl, each having two to 18 carbon atoms $n$ is a positive integer of from 1 to 3;

with 25 to 50 mole percent of a silicic acid source having the formula $$[Si(O)_m(X)_{4-2m}]_k$$

wherein $m$ is 0 to 1;

$k$ is a positive integer from 1 to 1000; and $X$ is alkoxyl having one to six carbon atoms.

17. A process for the preparation of a water-dispersible coupling agent consisting essentially of a partially copolymerized mixture of 50 to 75 mole percent of a hydroxysilane having the formula $$R_n\text{-}Si(OH)_{4-n}$$

wherein

R is selected from the group consisting of alkenylcarboxyalkyl and carboxyalkenyl, each having two to 18 carbon atoms $n$ is a positive integer of from 1 to 3; with 25 to 50 mole percent of a silicic acid source having the formula $$[Si(O)_m(X)_{4-2m}]_k$$

wherein $m$ is 0 to 1;

$k$ is a positive integer from 1 to 1000; and

X is alkoxyl having one to six carbon atoms.

said process comprising contacting together in an aqueous solution a coupling agent formulation consisting essentially of a compatible mixture of 50 to 75 mole percent of an organofunctional silane having the formula $$R_n\text{-}SiX_{4-n}$$

wherein

R is selected from the group consisting of carboxyalkylene and alkenylcarboxyalkyl;

X is alkoxyl; and $n$ is a positive integer of from 1 to 3; with 25 to 50 mole percent of an organofunctional silane having the formula $$[Si(O)_m(X)_{4-2m}]_k$$

wherein $m$ is 0 to 1;

$k$ is a positive integer from 1 to 1,000;

X is alkoxyl having one to six carbon atoms.

* * * * *